United States Patent
Zarum et al.

(10) Patent No.: US 10,754,872 B2
(45) Date of Patent: Aug. 25, 2020

(54) AUTOMATICALLY EXECUTING TASKS AND CONFIGURING ACCESS CONTROL LISTS IN A DATA TRANSFORMATION SYSTEM

(71) Applicant: Palantir Technologies Inc., Palo Alto, CA (US)

(72) Inventors: Asaf Zarum, London (GB); Robert Kruszewski, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 57 days.

(21) Appl. No.: 15/845,879

(22) Filed: Dec. 18, 2017

(65) Prior Publication Data
US 2018/0181632 A1    Jun. 28, 2018

Related U.S. Application Data

(60) Provisional application No. 62/439,813, filed on Dec. 28, 2016.

(51) Int. Cl.
*G06F 7/00* (2006.01)
*G06F 16/25* (2019.01)
*G06F 16/83* (2019.01)
*G06F 16/84* (2019.01)
*G06F 16/215* (2019.01)
*G06F 16/28* (2019.01)

(52) U.S. Cl.
CPC .......... *G06F 16/258* (2019.01); *G06F 16/215* (2019.01); *G06F 16/254* (2019.01);
(Continued)

(58) Field of Classification Search
CPC ......... G06F 17/30563; G06F 17/30569; G06F 17/30289
(Continued)

(56) References Cited

U.S. PATENT DOCUMENTS

| 5,978,475 A | 11/1999 | Schneier et al. |
| 6,253,203 B1 | 6/2001 | O'Flaherty et al. |

(Continued)

FOREIGN PATENT DOCUMENTS

| CN | 101729531 | 6/2010 |
| CN | 103281301 | 9/2013 |

(Continued)

OTHER PUBLICATIONS

VirusTotal—About, <http://www.virustotal.com/en/about/> Printed Jun. 30, 2014 in 8 pages.

(Continued)

*Primary Examiner* — Alexandria Y Bromell
(74) *Attorney, Agent, or Firm* — Hickman Palermo Becker Bingham LLP

(57) ABSTRACT

A computer-implemented system or process is programmed or configured to use a configuration file to specify one or more tasks to apply to raw ingested data. A task may be a sequence of instructions programmed or configured to format raw ingested data into a dataset in a CSV format. Examples of tasks may include: a parser to parse Cobol data into a CSV, a parser to parse XML into a CSV, a parser to parse text using fixed-width fields to a CSV, a parser to parse files in a zip archive into a CSV, a regular expression search/replace function, or formatting logic to remove lines or blank lines from raw ingested data. In one embodiment, the configuration file may specify a schema definition for a task to use for generating a dataset. In one embodiment, the configuration file may also include one or more access control list (ACL) definitions for the generated dataset. In one embodiment, the building of datasets using the configuration file is automated, for example, on a nightly basis.

21 Claims, 4 Drawing Sheets

(52) U.S. Cl.
CPC .............. *G06F 16/83* (2019.01); *G06F 16/86* (2019.01); *G06F 16/284* (2019.01)

(58) Field of Classification Search
USPC ........................................ 707/756, 781, 803
See application file for complete search history.

(56) References Cited

U.S. PATENT DOCUMENTS

| | | | |
|---|---|---|---|
| 6,397,205 B1 * | 5/2002 | Juola | G06F 16/35 |
| | | | 707/707 |
| 6,397,206 B1 * | 5/2002 | Hill | G06F 16/24542 |
| | | | 707/713 |
| 6,725,240 B1 | 4/2004 | Asad et al. | |
| 6,807,569 B1 | 10/2004 | Bhimani et al. | |
| 7,017,046 B2 | 3/2006 | Doyle et al. | |
| 7,069,586 B1 | 6/2006 | Winneg et al. | |
| 7,225,468 B2 | 5/2007 | Waisman et al. | |
| 7,596,285 B2 | 9/2009 | Brown et al. | |
| 7,770,032 B2 | 8/2010 | Nesta et al. | |
| 7,801,871 B2 | 9/2010 | Gosnell | |
| 7,962,495 B2 | 6/2011 | Jain et al. | |
| 8,181,253 B1 | 5/2012 | Zaitsev et al. | |
| 8,190,893 B2 | 5/2012 | Benson et al. | |
| 8,196,184 B2 | 6/2012 | Amirov et al. | |
| 8,239,668 B1 | 8/2012 | Chen et al. | |
| 8,301,904 B1 | 10/2012 | Gryaznov | |
| 8,312,546 B2 | 11/2012 | Alme | |
| 8,646,080 B2 | 2/2014 | Williamson et al. | |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,782,794 B2 | 7/2014 | Ramcharran | |
| 8,931,043 B2 | 1/2015 | Cooper et al. | |
| 9,021,260 B1 | 4/2015 | Falk et al. | |
| 9,047,246 B1 * | 6/2015 | Rahut | G06F 11/1425 |
| | | | 707/707 |
| 9,049,117 B1 | 6/2015 | Nucci et al. | |
| 9,100,428 B1 | 8/2015 | Visbal | |
| 9,335,897 B2 | 5/2016 | Goldenberg | |
| 9,338,013 B2 | 5/2016 | Castellucci et al. | |
| 9,684,543 B1 * | 6/2017 | Bequet | H04L 67/10 |
| | | | 707/707 |
| 2002/0112157 A1 | 8/2002 | Doyle et al. | |
| 2004/0123139 A1 | 6/2004 | Aiello et al. | |
| 2004/0153418 A1 | 8/2004 | Hanweck | |
| 2004/0250124 A1 | 12/2004 | Chesla et al. | |
| 2005/0157662 A1 | 7/2005 | Bingham et al. | |
| 2005/0229256 A2 | 10/2005 | Banzhof | |
| 2005/0262556 A1 | 11/2005 | Waisman et al. | |
| 2005/0275638 A1 | 12/2005 | Kolmykov-Zotov et al. | |
| 2006/0031928 A1 | 2/2006 | Conley et al. | |
| 2006/0069912 A1 | 3/2006 | Zheng et al. | |
| 2006/0179003 A1 | 8/2006 | Steele et al. | |
| 2006/0212931 A1 | 9/2006 | Shull et al. | |
| 2006/0218637 A1 | 9/2006 | Thomas et al. | |
| 2006/0265712 A1 * | 11/2006 | Zhou | G06F 40/14 |
| | | | 718/102 |
| 2006/0265747 A1 | 11/2006 | Judge | |
| 2007/0143851 A1 | 6/2007 | Nicodemus | |
| 2007/0294766 A1 | 12/2007 | Mir et al. | |
| 2008/0104407 A1 | 5/2008 | Horne et al. | |
| 2008/0201580 A1 | 8/2008 | Savitzky et al. | |
| 2008/0222706 A1 | 9/2008 | Renaud et al. | |
| 2008/0229422 A1 | 9/2008 | Hudis et al. | |
| 2009/0103442 A1 | 4/2009 | Douville | |
| 2009/0228701 A1 | 9/2009 | Lin | |
| 2009/0307640 A1 * | 12/2009 | Chapman | G06F 30/3323 |
| | | | 716/136 |
| 2009/0328222 A1 | 12/2009 | Helman et al. | |
| 2010/0077481 A1 | 3/2010 | Polyakov et al. | |
| 2010/0100963 A1 | 4/2010 | Mahaffey | |
| 2010/0179831 A1 | 7/2010 | Brown et al. | |
| 2010/0235915 A1 | 9/2010 | Memon et al. | |
| 2010/0262688 A1 | 10/2010 | Hussain et al. | |
| 2010/0318761 A1 * | 12/2010 | Moyer | G06F 12/1036 |
| | | | 711/207 |
| 2010/0330801 A1 | 12/2010 | Rouh | |
| 2011/0055480 A1 * | 3/2011 | Guyetant | G06F 12/084 |
| | | | 711/118 |
| 2011/0060910 A1 | 3/2011 | Gormish et al. | |
| 2011/0202555 A1 | 8/2011 | Cordover et al. | |
| 2011/0219450 A1 | 9/2011 | McDougal et al. | |
| 2012/0016901 A1 * | 1/2012 | Agarwal | G06F 16/258 |
| | | | 707/769 |
| 2012/0079592 A1 | 3/2012 | Pandrangi | |
| 2012/0084866 A1 | 4/2012 | Stolfo | |
| 2012/0110633 A1 | 5/2012 | An et al. | |
| 2012/0110674 A1 | 5/2012 | Belani et al. | |
| 2012/0159637 A1 * | 6/2012 | Dove | G16H 10/60 |
| | | | 726/26 |
| 2012/0169593 A1 | 7/2012 | Mak et al. | |
| 2012/0218305 A1 | 8/2012 | Patterson et al. | |
| 2012/0254129 A1 | 10/2012 | Wheeler et al. | |
| 2012/0284791 A1 | 11/2012 | Miller et al. | |
| 2012/0330801 A1 | 12/2012 | McDougal et al. | |
| 2013/0019306 A1 | 1/2013 | Lagar-Cavilla et al. | |
| 2013/0097709 A1 | 4/2013 | Basavapatna et al. | |
| 2013/0110876 A1 | 5/2013 | Meijer et al. | |
| 2013/0139268 A1 | 5/2013 | An et al. | |
| 2013/0239217 A1 | 9/2013 | Kindler et al. | |
| 2014/0013451 A1 | 1/2014 | Kulka et al. | |
| 2014/0059683 A1 | 2/2014 | Ashley | |
| 2014/0123279 A1 | 5/2014 | Bishop et al. | |
| 2014/0143009 A1 | 5/2014 | Brice et al. | |
| 2014/0173712 A1 | 6/2014 | Ferdinand | |
| 2014/0173738 A1 | 6/2014 | Condry et al. | |
| 2014/0188895 A1 | 7/2014 | Wang et al. | |
| 2014/0229422 A1 | 8/2014 | Jain et al. | |
| 2014/0279884 A1 * | 9/2014 | Dantkale | G06F 16/182 |
| | | | 707/620 |
| 2014/0283107 A1 | 9/2014 | Walton et al. | |
| 2014/0366132 A1 | 12/2014 | Stiansen et al. | |
| 2015/0039565 A1 | 2/2015 | Lucas | |
| 2015/0128274 A1 | 5/2015 | Giokas | |
| 2015/0188715 A1 | 7/2015 | Castelluci et al. | |
| 2015/0218504 A1 * | 8/2015 | Mangiacotti | C12M 1/36 |
| | | | 700/266 |
| 2015/0229664 A1 | 8/2015 | Hawthorn et al. | |
| 2015/0236927 A1 * | 8/2015 | Langer | H04L 41/509 |
| | | | 709/226 |
| 2015/0248563 A1 | 9/2015 | Alfarano et al. | |
| 2015/0261847 A1 | 9/2015 | Ducott et al. | |
| 2015/0326601 A1 | 11/2015 | Grondin et al. | |
| 2016/0004864 A1 | 1/2016 | Falk et al. | |
| 2016/0028759 A1 | 1/2016 | Visbal | |
| 2017/0351989 A1 * | 12/2017 | Langdon | G06Q 10/06315 |
| | | | 707/707 |
| 2018/0032535 A1 * | 2/2018 | Johnson | H04L 67/04 |
| | | | 707/707 |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| NL | 2011642 | 8/2015 |
| WO | WO 2005/010685 | 2/2005 |

OTHER PUBLICATIONS

Schneier et al., "Automatic Event Stream Notarization Using Digital Signatures," Security Protocols, International Workshop Apr. 1996 Proceedings, Springer-Verlag, 1997, pp. 155-169, https://schneier.com/paper-event-stream.pdf.

Crosby et al., "Efficient Data Structures for Tamper-Evident Logging," Department of Computer Science, Rice University, 2009, pp. 17.

(56) References Cited

OTHER PUBLICATIONS

Ma et al., "A New Approach to Secure Logging," ACM Transactions on Storage, vol. 5, No. 1, Article 2, Published Mar. 2009, 21 pages.
Glaab et al., "EnrichNet: Network-Based Gene Set Enrichment Analysis," Bioinformatics 28.18 (2012): pp. i451-i457.
FireEye, <http://www.fireeye.com/> Printed Jun. 30, 2014 in 2 pages.
Lee et al., "A Data Mining and CIDF Based Approach for Detecting Novel and Distributed Intrusions," Lecture Notes in Computer Science, vol. 1907 Nov. 11, 2000, pp. 49-65.
Schneier et al., "Cryptographic Support for Secure Logs on Untrusted Machines," The Seventh Usenix Security Symposium Proceedings, USENIX Press, Jan. 1998, pp. 53-62, https://www.schneier.com/paper-secure-logs.pdf.
FireEye—Products and Solutions Overview, <http://www.fireeye.com/products-and-solutions> Printed Jun. 30, 2014 in 3 pages.
Bhuyan et al., "Network Anomaly Detection: Methods, Systems and Tools," First Quarter 2014, IEEE.
Baker et al., "The Development of a Common Enumeration of Vulnerabilities and Exposures," Presented at the Second International Workshop on Recent Advances in Intrusion Detection, Sep. 7-9, 1999, pp. 35.
Hur et al., "SciMiner: web-based literature mining tool for target identification and functional enrichment analysis," Bioinformatics 25.6 (2009): pp. 838-840.
Waters et al., "Building an Encrypted and Searchable Audit Log," Published Jan. 9, 2004, 11 pages, http://www.parc.com/content/attachments/building_encrypted_searchable_5059_parc.pdf.
Zheng et al., "GOEAST: a web-based software toolkit for Gene Ontology enrichment analysis," Nucleic acids research 36.suppl 2 (2008): pp. W385-W363.
Ponniah, Paulraj, "Data Warehousing Fundamentals", Chapter 12 Data Extraction, Transformation, and Loading dated Jan. 1, 2001, pp. 257-289.
Kimball et al., "The Data Warehouse ETL Toolkit", Practical Techniques for Extracting, Cleaning, Conforming and Delivering Data, dated Aug. 18, 2004, 61 pages.
European Patent Office, "Search Report" in application No. 17208642.3-1222, dated Apr. 24, 2018, 7 pages.
European Claims in application No. 17208642.3-1222, dated Apr. 2018, 3 pages.

* cited by examiner

AUTOMATICALLY EXECUTING TASKS AND CONFIGURING ACCESS CONTROL LISTS IN A DATA TRANSFORMATION SYSTEM

CROSS-REFERENCE TO RELATED APPLICATIONS: BENEFIT CLAIM

This application claims the benefit of U.S. Provisional Application No. 62/439,813, filed Dec. 28, 2016, the entire contents of which is hereby incorporated by reference as if fully set forth herein, under 35 U.S.C. § 119(e).

TECHNICAL FIELD

The present disclosure relates to a data transformation system. More specifically, the disclosure relates to automatically executing tasks and configuring access control lists in a data transformation system.

BACKGROUND

A data transformation system takes one or more datasets as input and applies business logic to the input datasets to generate one or more output data sets. Data may be first ingested as a raw data from a data source. Ingestion of data into a data transformation system can be challenging, as the ingested data may not be formatted as an expected dataset. For example, the ingested data may be formatted as COBOL data, XML data, or some other format, and the data transformation system expects datasets to be in a CSV format. Furthermore, ingested data may not have a schema definition. Additionally, ingested data may not have a configuration for access control list (ACL) permission settings to protect the data and limit that users and/or accounts have access to the ingested data. Thus, what is needed is a system to automate the ingestion of data into a data transformation system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
  2.1 DATA FORMATTER
    2.1.1 DATA FORMATTER CONFIGURATION FILE
    2.1.2 TASK LOGIC
  2.2 ORCHESTRATOR
    2.2.1 ORCHESTRATOR CONFIGURATION FILE
    2.2.2 DATA TRANSFORMATION JOBS
3.0 EXAMPLE PROCESS AND ALGORITHM
4.0 IMPLEMENTATION MECHANISMS—HARDWARE OVERVIEW
5.0 IMPLEMENTATION MECHANISMS SOFTWARE OVERVIEW
6.0 OTHER ASPECTS OF DISCLOSURE 1.0 General Overview In one embodiment, a computer-implemented process is programmed or configured to use a configuration file to specify one or more tasks to apply to raw ingested data. A task may be a sequence of instructions programmed or configured to format raw ingested data into a dataset in a comma separated value (CSV) format. Examples of tasks may include: a parser to parse COBOL data into a CSV, a parser to parse XML into a CSV, a parser to parse text using fixed-width fields to a CSV, a parser to parse files in a zip archive into a CSV, a regular expression search/replace function, or formatting logic to remove lines or blank lines from raw ingested data. In one embodiment, the configuration file may specify a schema definition for a task to use for generating a dataset. In one embodiment, the configuration file may also include one or more access control list (ACL) definitions for the generated dataset. In one embodiment, the building of datasets using the configuration file is automated according to a schedule, for example, on a nightly basis.

2.0 Example Computer System Implementation

Figure 1:
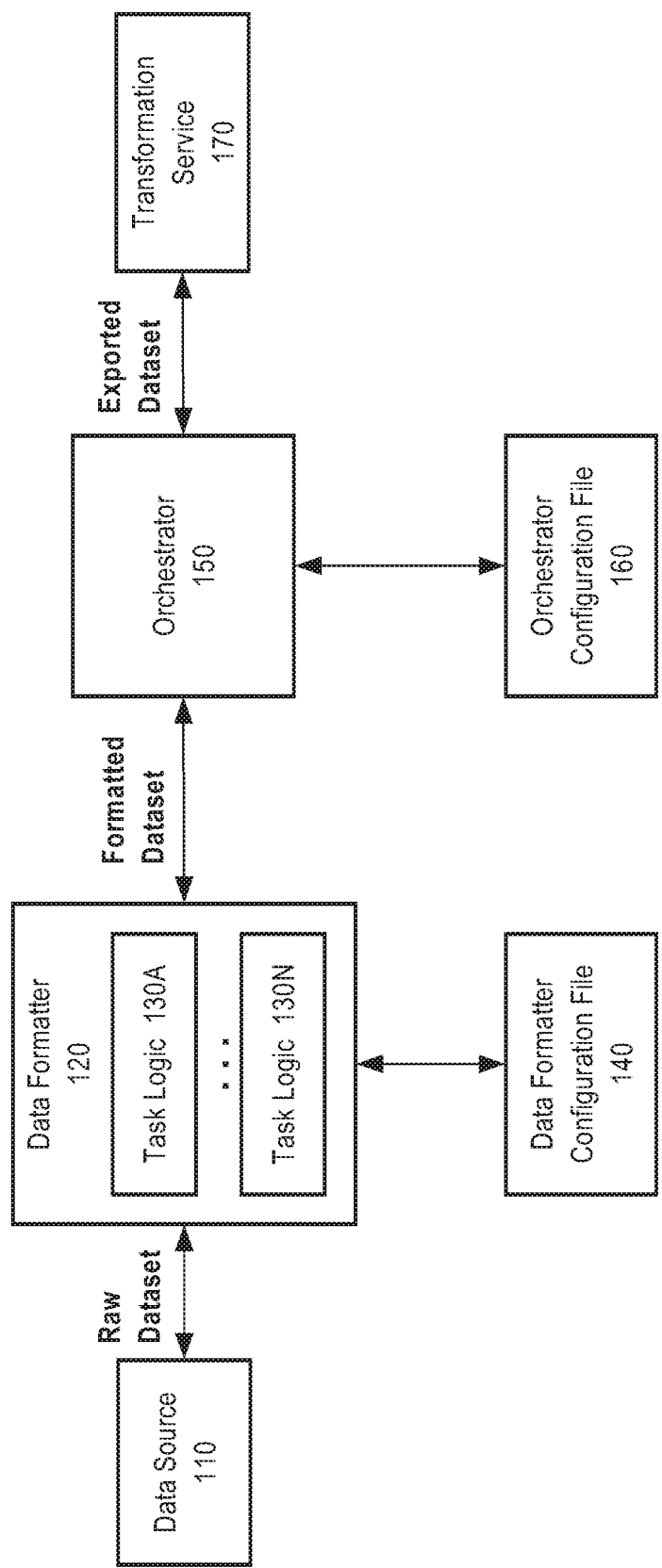
FIG. 1 is a block diagram of a data transformation system, according to one embodiment.

FIG. 1 illustrates an example in which the techniques described herein may be practiced, according to some embodiments. In the example of FIG. 1, data transformation system 100 is a computer system programmed or configured to automatically execute data formatting tasks and configure access control lists (ACLS) for ingested raw datasets. The example components of data transformation system 100 shown in FIG. 1 are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. Data transformation system 100 illustrates only one of many possible arrangements of components configured to execute the programming described herein. Other arrangements may include fewer or different components, and the division of work between the components may vary depending on the arrangement.

Data transformation system 100 includes one or more data sources 110. A "data source" may be any repository of computer-implemented datasets. A "dataset" may be defined as any computer-implemented collection of data, such as a file, a data object, a database entry, a data message, or any other similar representation of computer-implemented data. The embodiments described herein do not require any particular type or format of the datasets provided by a data source. Thus, a data source may comprise a file system, a relational database managements system (RDBMS), a non-relational database, an object store, a distributed file system (DFS) such as a Hadoop distributed file system (HDFS), a Java Database Connectivity (JDBC) source, an email repository, data received through an application programming interface (API), a source code repository, a cloud-based data repository such as Amazon Simple Storage Service (S3), a message queue, or any other repository on one or more computing devices that contains datasets.

Data transformation system 100 includes a data formatter 120 that is communicatively coupled to data source 110 and data formatter configuration file 140. Data formatter 120 is programmed or configured to receive raw datasets from data source 110, and use data formatter configuration file 140 to apply one or more data formatting tasks to the raw datasets to generate formatted datasets. Additionally, data formatter 120 may be programmed or configured to apply a schema to the raw datasets when generating formatted datasets. In an embodiment, data formatter 120 may be programmed or configured to store raw datasets and/or formatted datasets in a datastore (not depicted).

Data formatter 120 is programmed or configured to include one or more sets of task logic 130A and 130N. For purposes of illustrating a clear example, two (2) instances of task applications are shown in FIG. 1, but the ellipsis in FIG. 1 and the label "N" in "130N" is intended to indicate that any number of task logics 130 may be present in other embodiments. Each of the task logics 130A through 130N may be any process, system, application, program, script, job, daemon, and/or server that is programmed or configured to process a dataset. Task logic 130 is a sequence of instructions for performing a data formatting task on a raw dataset to generate a formatted dataset. Each set of task logic 130 may be used by data formatter 120 to execute a data formatting task. Further details regarding task logic 130 are described herein in other sections.

Data transformation system 100 includes orchestrator 150. Orchestrator 150 is communicatively coupled to data formatter 120, orchestrator configuration file 160, and transformation service 170. Orchestrator 150 is programmed or configured to retrieve a formatted dataset from data formatter 120, and use orchestrator configuration file 160 to cause one or more exported datasets to be generated. In an embodiment, orchestrator 150 may add one or more ACLs to an exported dataset based on orchestrator configuration file 160.

Data transformation system 100 includes transformation service 170. Transformation service is communicatively coupled to orchestrator 150. In an embodiment, transformation service 170 is programmed or configured to receive exported datasets from orchestrator 150 and/or retrieve exported datasets from a datastore and apply one or more data transformation jobs to the exported datasets. A data transformation job is a unit of work that can be executed to perform the computation of a new dataset or a new version of an existing dataset. In some embodiments, a data transformation job computes an output dataset from the data of a set of input datasets. Thus, a data transformation job may take one or more input datasets, perform data transformation processing on those input datasets, and generate one or more output datasets. The output datasets may be a new version of an existing dataset or a new dataset altogether. In one embodiment, transformation service 170 is configured to manage data transformation jobs performed on the exported dataset in accordance with one or more settings as specified in orchestrator configuration file 160.

2.1 Data Formatter

A raw dataset received from data source 110 may be misformatted for what a transformation service 170 expects. In one embodiment, a raw dataset may be misformatted because the type of the dataset, such as the file type for a file, is an improper type. In an embodiment, a dataset needs to be formatted as a comma separated value (CSV) file in order to be properly formatted and/or readable. In another embodiment, a raw dataset may be misformatted because the content of the raw dataset may include unexpected values or improperly formatted values. In another embodiment, a raw dataset may be misformatted because it lacks a schema definition for the contents of the raw dataset.

Data formatter 120 is programmed or configured to receive raw datasets from data source 110, and use data formatter configuration file 140 to apply one or more data formatting tasks to the raw datasets to generate formatted datasets. Additionally, data formatter 120 may be programmed or configured to apply a schema to the raw datasets when generating formatted datasets. Thus, data formatter 120 can take as an input a raw dataset and generate as an output a formatted dataset.

2.1.1 Data Formatter Configuration File

A data formatter configuration file 140 is a configuration file that specifies instructions, parameters, or settings, for formatting a raw dataset. These instructions, parameters, and/or settings may include instructions for data formatter tasks to perform on a raw dataset to generate a formatted dataset and/or a schema definition for the formatted dataset. Thus, data formatter 120 can use data formatter configuration file 140 to determine how a raw dataset should be formatted in order to generate a formatted dataset. A user can provide custom details in a data formatter configuration file 140 to customize the handling of a particular raw dataset received from data source 110. Table A illustrates an example data formatter configuration file 140 according to one embodiment, however, the format, syntax, tags, or other features of such a data formatter configuration file 140 may vary in different implementations:

TABLE A

```
{
    "jobspec": {
        "inputs": [
            {
                "datasetPath": "/foo/bar/source.txt"
            }
        ],
        "jobType": "data_formatter",
        "jobConfiguration": {
            "tasks": [
                {
                    "type": "RemoveLinesTask",
                    "header": "3",
                    "footer": "18"
                },
```

TABLE A-continued

```
        {
            "type": "FixedWidthTask",
            "widths": ["5", "15", "15", "10"]
        }
        ],
        "schema": {
            "fieldDelimiter": ",",
            "nullValues": [
                "NULL"
            ],
            "parser": "CSV_PARSER",
            "columns": [
                ["USER_ID", "Integer"],
                ["FIRST_NAME", "String"],
                ["LAST_NAME", "String"],
                ["DOB", "Date" ]
            ]
        }
    }
  }
}
```

The data formatter configuration file 140 specified in Table A can be written in any programming language, scripting language, or other syntax. In the example of Table A, data formatter configuration file 140 includes a "jobType" tag that indicates that the configuration file is used for a "data formatter" job type, which corresponds to data formatter 120.

In an embodiment, data formatter configuration file 140 may define one or more input datasets as a raw dataset that can be retrieved from a data source 110. In the example of Table A, data formatter configuration file 140 includes an "inputs" tag, which may specify one or more raw datasets to retrieve from data source 110. In this particular example, the "datasetPath" indicates that the raw dataset retrieved from data source 110 is located at the file path "/foo/bar/source.txt".

In an embodiment, data formatter configuration file 140 may define a job configuration that specifies one or more data formatting tasks to apply to a raw dataset and/or a schema to apply to raw dataset. In the example of Table A, the job configuration is specified via the "jobConfiguration" tag.

In the example of Table A, data formatter configuration file 140 identifies two tasks for formatting a raw dataset, as identified with the "tasks" tag. The first task, as identified with the "type tag" is RemoveLinesTask. The second task, as identified with the "type" tag is "FixedWidthTask". Each of these entries in the data formatter configuration file 140 is an identifier of a task that data formatter 120 should apply to the raw dataset retrieved from data source 110. Each of these entries corresponds to a particular task logic of task logic 130A through 130N. Further details regarding task logic 130 will be discussed herein. Thus, the data formatter configuration file 140 specifies identifiers for tasks that are to be performed by data formatter 120 based on a particular task logic 130. In this particular example, multiple tasks are identified. In an embodiment, when a data formatter configuration file 140 identifies multiple tasks for data formatting, the corresponding task logic 130A through 130N will be applied, in sequential order, as specified in data formatter configuration file 140. In this particular example of Table A, the "RemoveLines" task will be executed first on the raw dataset, and then the "FixedWidthTask" will be executed on the raw dataset.

Some tasks may require further task-specific criteria for execution. A task-specific criteria is a parameter or setting that can be used by a corresponding task logic 130 during execution. In an embodiment, data formatter configuration file 140 may include task-specific criteria that are necessary for the execution of a particular task. Task-specific criteria may vary based on a particular task. In this particular example of Table A, the RemoveLinesTask includes a "header" criteria with a value of "3" and a "footer" criteria" with a value of "18". Likewise, in this example of Table A, the FixedWidthTask includes a "widths" criteria with an array of values: "5", "15", "15", and "10". Thus, task-specific criteria in a data formatter configuration file 140 allows for customization of which task logic 130 will be executed on a raw dataset to generate a formatted dataset as well as any necessary configuration settings for that task logic 130.

In an embodiment, data formatter configuration file 140 may include a schema definition. A schema definition is a set of configuration file settings that define the overall schema format of the formatted dataset that is output by data formatter 120. Data formatter 120 can use the schema definition to determine the schema of the formatted dataset. In the example of Table A, the schema definition is denoted by the "schema" tag.

In an embodiment, a schema definition of a data formatter configuration file 140 may specify a field delimiter. A field delimiter is a setting that specifies how different fields in the formatted dataset should be delimited in the output dataset. In the example of Table A, the field delimiter is specified via the "fieldDelimiter" tag which is specified as "," (e.g., a comma). In this example, commas will be used to delimit different fields of values in the formatted dataset. Thus, the formatted dataset will be a CSV In an embodiment, a schema definition of a data formatter configuration file 140 may specify how a formatted dataset should display or handle null values found in raw dataset. In the example of Table A, the handling of null values is specified via the "nullValues" tag which is specified as "NULL". Thus, in this particular example, any null values detected in the raw dataset will be formatted as the text "NULL" in the formatted dataset.

In an embodiment, a schema definition of a data formatter configuration file 140 may specify a parser to use for parsing a raw dataset. In the example of Table A, the "parser" tag specifies that the "CSV_PARSER" should be used for parsing the raw dataset. In an embodiment, the parser identified in the data formatter configuration file 140 may correspond to a specific set of parser logic in data formatter 120, such as a function or method. Thus, the specific set of parser logic in data formatter 120 may be used based for parsing the raw dataset based on this setting in the data formatter configuration file 140.

In an embodiment, a schema definition of a data formatter configuration file 140 may specify one or more columns for the schema of the formatted dataset. Such configuration information may include the names of the columns of the formatted dataset, the data types of the columns of the formatted dataset, the order of the columns of the formatted dataset, and any other characteristics of the columns of the formatted dataset. In the example of Table A, the columns for the schema of the formatted dataset are specified by the "columns" tag. In this particular example, the formatted dataset includes four columns: USER_ID. FIRST_NAME, LAST_NAME, and DOB which have respective data types of Integer, String, String, and Date.

The data formatter configuration file 140 of data transformation system 100 thus allows for the specification of customized parameters and settings for the processing of a raw dataset into a formatted dataset by a data formatter 120. The customized parameters and settings of data formatter configuration file 140 can specify the location of the raw dataset on data source 110, an identification of one or more tasks for execution for formatting the raw dataset into a formatted dataset, an identification of the parser to sue for parsing the raw dataset, and the schema definition for the formatted dataset. Thus, the present data transformation system 100 provides for customized ingestion and preparation of datasets retrieved from data source 110 so that they conform to an expected format and structure.

2.1.2 Task Logic

Data formatter 120 is programmed or configured to include one or more sets of task logic 130A and 130N. Task logic 130 is a sequence of instructions for performing a data formatting task on a raw dataset to generate a formatted dataset. Different sets of task logic 130A through 130N may exist for different data formatting tasks. A data formatting task takes a dataset as an input, and applies one or more rules, parsers, formatters, or schema definitions for generating an output dataset. Multiple data formatting tasks may be applied to a raw dataset in order to generate a formatted data set.

In an embodiment, a data formatting task may require one or more task-specific criteria, which is a parameter or setting that is specific to that type of data formatting task. In an embodiment, each task logic 130A through 130N corresponds to a different data formatting task. Examples of different sets of task logic 130 include the following examples.

CobolParserTask is task logic 130 for a data formatting task that is programmed or configured to take a COBOL binary input file as an input dataset and generate a CSV file as an output dataset. In an embodiment, task-specific criteria may include byte size criteria that specifies the expected size and location of particular fields of data in the COBOL binary file to use for generating the output CSV file dataset. CobolParserTask can thus use the byte size criteria to map the fields of a COBOL binary input file into a CSV file.

CsvRemoveNewLinesTask is task logic 130 for a data formatting task that is programmed or configured to take a CSV file as an input dataset and generate a CSV file as an output dataset. During task execution, the CsvRemoveNewLinesTask may be programmed or configured to strip out newlines from the input dataset when generating the output dataset.

FixedWidthTask is task logic 130 for a data formatting task that is programmed or configured to take a single-column input dataset with fixed-width fields and generate a multicolumn CSV file as an output dataset. In an embodiment, task-specific criteria may include a specification of the expected widths of fields in the single-column input dataset. For example, returning to the example in Table A, the "widths" criteria specifies an array of values "5, 15, 15, 10. This array of values can be used to identify and map the fields of values from a single-column input dataset, where the first 5 characters constitute the first fixed-width field, the next 15 characters constitute the second fixed-width field, the next 15 characters constitute the third fixed-width field, and the next 5 characters constitute the fourth fixed-width field. During execution the FixedWidthTask may be programmed or configured to convert the single-column input dataset into a CSV file output dataset using the task-specific criteria for the definition of fixed-width fields.

LineReplaceText is task logic 130 for a data formatting task that is programmed or configured to take an input dataset that includes text and apply a regular expression on each line of data in the input dataset to generate an output dataset. The regular expression may be specified via task-specific criteria and may be a search-and-replace regular expression.

ParseXmlToCsvTask is task logic 130 for a data formatting task that is programmed or configured to take an extensible markup language (XML) file as an input dataset and generate an output dataset in a CSV file format. In an embodiment, task-specific criteria may specify how to map the tagged fields of the XML file to a CSV file.

RemoveBlankLinesTask is task logic 130 for a data formatting task that is programmed or configured to take an input data set and generate an output dataset after removing blank lines from the input dataset. Thus, during execution, any blank or empty lines in in the input dataset are removed, to prevent errors or exceptions based on an unexpected data format.

RemoveLinesTask is task logic 130 for a data formatting task that is programmed or configured to take an input dataset and remove a fixed count of rows of data from the input dataset when generating an output dataset. Task-specific criteria may specify a fixed count of rows to remove from the header or footer of the input dataset during execution. In the example of Table A, the task-specific criteria for the RemoveLinesTask specifies that three (3) lines of header content needs to be removed and that 18 lines of footer content needs to be removed. Thus, the RemoveLinesTask may be used for cleaning up unwanted rows of data from an input dataset when generating an output dataset, such as unwanted header or footer data.

Spreadsheet2CsvTask is task logic 130 for a data formatting task that is programmed or configured to take an input dataset in a spreadsheet file type (e.g., ".xls", ".xlsx", ".numbers", etc.) and convert the raw data in the input dataset into a CSV file output dataset.

ZipExtractorTask is task logic 130 for a data formatting task that is programmed or configured to take an input dataset in a zip archive (e.g. ".zip", ".7z", ".gz", ".rar", etc.) and generate a CSV file output dataset. The zip archive is expected to include text content. Thus, ZipExtractorTask may be programmed or configured to unzip the zip archive and map the text content of the zip archive to fields of an output dataset according to one or more rules. The rules may be hardcoded by task logic 130 or may be specified via a task-specific parameter. In an embodiment, ZipExtractorTask may be further programmed or configured to decrypt an encrypted zip archive, if necessary. In an embodiment, an encryption key necessary to decrypt the zip archive may be specified in the data formatter configuration file 140.

The above examples of task logic 130 are merely illustrative and additional tasks for the formatting of a raw dataset into a formatted dataset may be implemented. In an embodiment, when task logic 130 is used to generate a formatted dataset, the schema definition included in data formatter configuration file 140 may be used for defining the schema of the formatted dataset.

The present system thus provides a customized solution for ingesting raw datasets from a data source 110 and applying appropriate data formatting tasks and schemas to the raw datasets to generate formatted datasets for further processing using a data formatter configuration file 140. The data formatting tasks are specified via the data formatter configuration file 140. In an embodiment, multiple tasks may be executed on the same dataset to generate a formatted dataset. In an embodiment, the formatted datasets are in a CSV file format. In an embodiment, the formatted datasets are implemented in a schema that complies with the schema definition of the formatter configuration file 140.

2.2 Orchestrator

The output of data formatter 120 is a formatted dataset that has been formatted and implemented in a schema based on one or more of task logic 130A through 130N as specified in data formatter configuration file 140. The formatted dataset, however, may require additional processing prior to transformation service 170 applying a data transformation job to it.

Orchestrator 150 is programmed or configured to receive a formatted dataset from data formatter 120, and use orchestrator configuration file 160 to generate one or more exported datasets. The exported datasets may be used by transformation service 170 in a data transformation job. In an embodiment, orchestrator 150 may use orchestrator configuration file 160 to generate exported dataset from formatted dataset.

2.2.1 Orchestrator Configuration File

Orchestrator configuration file 160 is a configuration file that specifies instructions, parameters, or settings, for processing a formatted dataset into an exported dataset. These instructions, parameters, and/or settings may include settings for ACLs for a formatted dataset. Thus, orchestrator 150 can use orchestrator configuration file 160 for specifying permission settings that can limit what users and/or groups can access the exported dataset. A system administrator can provide custom details in an orchestrator configuration file 160 to customize the ACLs for an exported dataset. Table B illustrates an example excerpt of an orchestrator configuration file 160 according to one embodiment, however, the format, syntax, tags, or other features of such an orchestrator configuration file 160 may vary in different implementations:

TABLE B

```
{
    "aclSpec": {
        "viewers": [
            {type: "groupNames",
                "groups": ["alphaGroup", "betaGroup"]
            },
            {type: "UserNames",
                "users": ["gammaUser"]
            }
        ],
        "editors": [
            {type: "userNames",
                "users": ["deltaUser"]
            }
        ]
    }
}
```

The orchestrator configuration file 160 specified in Table B can be written in any programming language, scripting language, or other syntax.

In an embodiment orchestrator configuration file 160 may define one or more access control list (ACL) settings for a dataset. ACL settings define access permissions for an exported dataset. In an embodiment, the ACL settings for an exported dataset may be propagated to any dependent datasets that are generated based on the exported dataset. In an embodiment, these ACL settings may be used by transformation service 170 to control who has read and/or edit permissions for accessing an exported dataset and/or the contents of the data transformation jobs performed on the exported dataset. In the example of Table B, the ACL settings are specified via the "aclSpec" tag.

ACL settings may include settings for read access and/or edit access for an exported dataset. ACL settings may further include settings for groups of users and/or individual users. In the example of Table B, the "viewers" tag may be used to specify read access for an exported dataset and the "editors" tag may be used to specify edit access for an exported dataset. In this particular example, the user groups named "alphaGroup" and "betaGroup" are granted read access to an exported dataset. Specifically, all users associated with alphaGroup or betaGroup will be able to view the contents of an exported dataset. Likewise, the individual user named "gammaUser" is granted read access to the exported dataset and may thus view the contents of the exported dataset. Thus, all users associated with alphaGroup and betaGroup, as well as gammaUser will have access to the exported dataset in transformation service 170.

Furthermore, in the example of Table B, the "editors" tag specifies that the deltaUser may edit the exported dataset. In one embodiment, and edit access permission in an ACL is required in order to run a data transformation job on an exported dataset in transformation service 170.

Thus, orchestrator 150 may use orchestrator configuration file 160 to define one or more ACL settings for an exported dataset. In one embodiment, these ACL settings may be packaged with the exported dataset so that, transformation service 170 may view them. In another embodiment, orchestrator 150 may send the ACL settings to a security service not depicted) that may be programmed or configured to control access permissions to an exported dataset in transformation service 170.

2.2.2 Data Transformation Jobs

In an embodiment, transformation service 170 may be programmed or configured to apply one or more data transformation jobs to an exported dataset received from orchestrator 150. Data transformation jobs may include business logic for computations to generate new datasets or new versions of an existing dataset. Thus, in one embodiment, exported datasets may be modified by transformation service 170 into versioned datasets. Further details regarding the branching of datasets may be found in U.S. patent application Ser. No. 14/874,690 ("Domain Specific Language for Dataset Transformation"), which is incorporated by reference as if set forth herein.

In an embodiment, orchestrator configuration file 160 may include a setting that specifies a schedule for transformation service 170 to perform a data transformation job on an exported dataset (not depicted in Table B). For example, orchestrator configuration file 160 may specify a job scheduler to apply a data transformation job to an exported dataset on a nightly build basis. Thus, orchestrator 150 may use the orchestrator configuration file 160 to schedule builds of data transformation jobs on an exported dataset. In an embodiment, orchestrator 150 may package the schedule settings from orchestrator configuration file 160 with the exported dataset so that transformation service 170 has access to it when it manipulates exported dataset. In another embodiment, orchestrator 150 may include an application programming interface (API) endpoint that may be used to cause the orchestrator 150 to apply one or more data transformation jobs. An external application (not depicted) may be communicatively coupled to orchestrator 150 via the API and may use the API to cause the orchestrator 150 to apply one or more data transformation jobs. In one embodiment, the external application may use its own job scheduler to manage the scheduling of jobs on orchestrator 150. Thus, an external application may use its own job scheduler to schedule builds of data transformation jobs via the API of orchestrator 150 rather than including the job scheduler as part of the orchestrator configuration file 160.

In an embodiment, orchestrator configuration file 160 may include a setting that specifies a transformation task that transformation service 170 needs to perform on an exported dataset (not depicted in Table B). For example, a transformation task may specify one or more data transformation jobs to apply. The transformation task may be specified in the orchestrator configuration file 160. Thus, orchestrator 150 may use the orchestrator configuration file 160 to notify transformation service 170 that it needs to execute the necessary transformation tasks. In an embodiment, transformation task information may be packaged with the exported dataset so that transformation service 170 has access to the transformation tasks when it processes the exported dataset.

The present data transformation system 100 thus allows a user to specify, via an orchestrator configuration file 160, details of how a formatted dataset should be handled when sent to the transformation service as an exported dataset. These details may include ACL settings, scheduling information for data transformation jobs, and/or an identification of the data transformation jobs that transformation service 170 needs to perform on the exported dataset.

Although depicted in FIG. 1 as two separate files, in an embodiment, data formatter configuration file 140 and orchestrator configuration file 160 may be implemented in the same file or a set of files.

3.0 Examples Process and Algorithm

Figure 2:
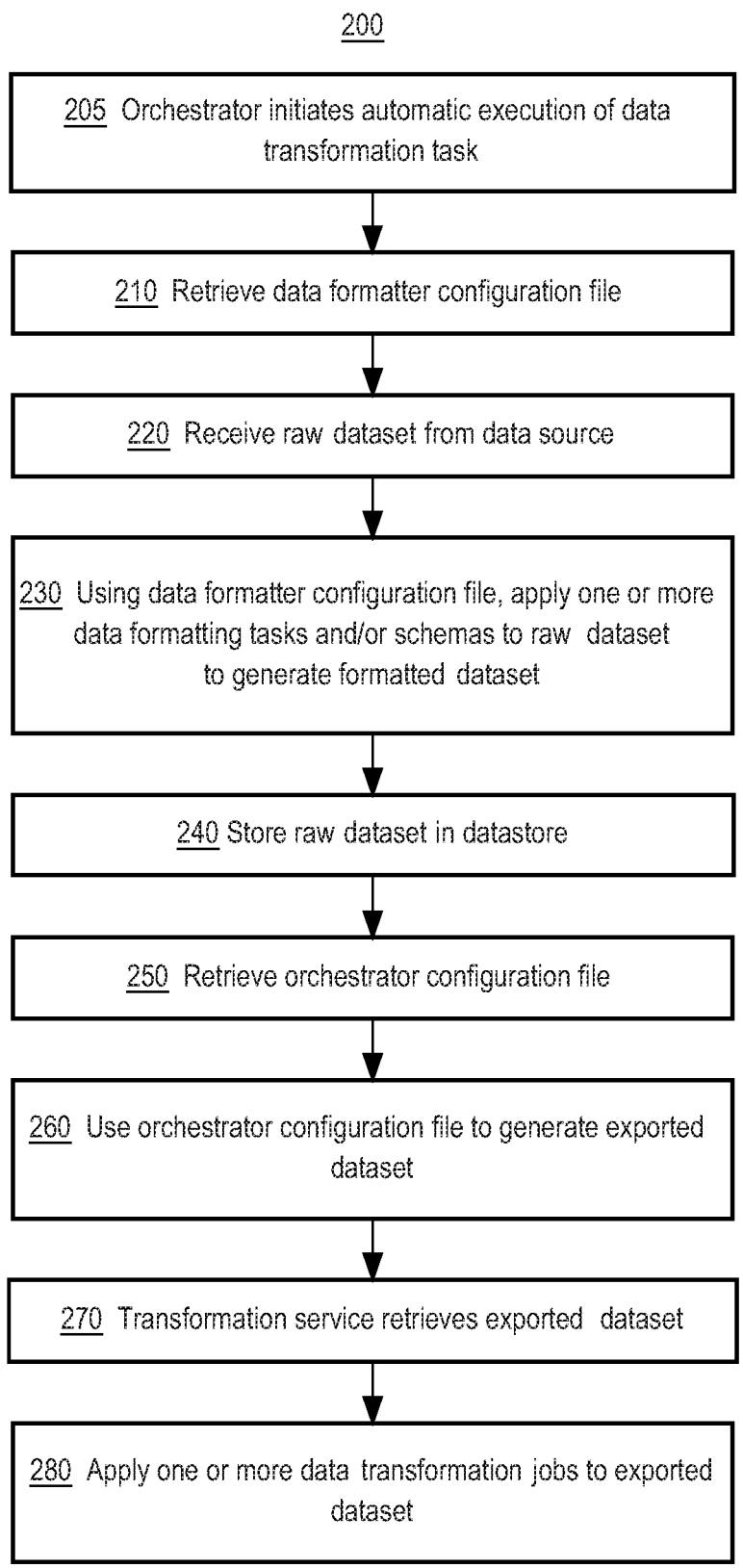
FIG. 2 is a flow diagram of a process for automatically executing data formatting tasks in a data transformation system

FIG. 2 illustrates a flow diagram of an example process 200 for automatically executing data formatting tasks in a data transformation system 100. FIG. 2 is intended to disclose an algorithm or functional description that may be used as a basis of writing computer programs to implement the functions that are described herein, and which cause a computer to operate in the new manner that is disclosed herein. Further, FIG. 2 is provided to communicate such an algorithm at the same level of detail that is normally used, by persons of skill in the art to which this disclosure is directed, to communicate among themselves about plans, designs, specifications and algorithms for other computer programs of a similar level of complexity.

The process 200 may start at step 205. In step 205, orchestrator 150 is programmed or configured to initiate automatic execution of a data formatting task in a data transformation system 100. The initiation of automatic execution of the data formatting task may be programmed or configured via a scheduler of orchestrator 150, a configuration setting of orchestrator 150, via manual user input received at orchestrator 150, or via an API call to orchestrator 150. Orchestrator 150 initiates the data formatting task by notifying data formatter 120. The process 200 may then proceed to step 210.

In step 210, data formatter 120 is programmed or configured to retrieve a data formatter configuration file 140. Data formatter configuration file 140 includes settings, parameters and other criteria for the formatting of a raw dataset into a formatted dataset. Thus, data formatter configuration file 140 allows a user to customize the formatting of raw datasets into a formatted dataset suitable for further processing by data transformation system 100. The process 200 may then proceed to step 220.

In step 220, data formatter 120 is programmed or configured to receive a raw dataset from data source 110. In an embodiment, data source 110 may send the raw dataset to data formatter 120. In another embodiment, data formatter 120 may be programmed or configured to retrieve the raw dataset from data source 110. For example, in one embodiment, data formatter 120 may use a file path specified in data formatter configuration file 140 to identify a location of where to find a raw dataset at data source 110. Once the raw dataset has been received by data formatter 120, the process 200 may proceed to step 230.

In step 230, the data formatter 120 uses the data formatter configuration file 140 to process the raw data set and generate a formatted dataset. In an embodiment, the data configuration file 140 may identify one or more data formatting tasks that need to be applied to the raw dataset. The data configuration file 140 may further identify one or more task-specific criteria necessary for the execution of the data formatting task(s). In an embodiment, data formatter 120 may use the data transformation tasks specified in the data formatter configuration file 140 to identify a particular task logic 130 to execute in order to process the specified data transformation task. In an embodiment, task logic 130 may refer to a sequence of programming instructions for performing a data formatting task, and may include one or more functions, methods, or other programming constructs. In one embodiment, data formatter 120 will execute the appropriate task logic 130 with the appropriate task-specific criteria as parameters, if necessary, on the raw dataset in order to generate the formatted dataset. In one embodiment, multiple sets of task logic 130A through 130N may be executed if the data formatter configuration file 140 identifies a sequence of data formatter tasks to execute. In an embodiment, data formatter configuration file 140 may further specify a schema definition for the formatted dataset. Thus, the formatted dataset generated by data formatter 120 is formatted in accordance with the schema definition. Once the formatted dataset is generated, the process 200 may then proceed to step 240.

In step 240, the data formatter 120 stores the formatted dataset in a datastore. In an embodiment, the formatted dataset is now a CSV file. In an embodiment, the formatted dataset is CSV file that conforms to a schema definition specified in data formatter configuration file 140. Thus, the formatted dataset is now ready for further processing by the data transformation system 100. The process 200 may then proceed to step 250.

In step 250, orchestrator 150 is programmed or configured to retrieve the orchestrator configuration file 160. In one embodiment, the orchestrator configuration file 160 is a separate configuration file from data formatter configuration file 140, however, in another embodiment, they are the same file or set of files. Orchestrator configuration file 160 includes settings and parameters for the orchestration of data transformation of the formatted dataset. For example, orchestrator configuration file 160 may include one or more settings that define an access control list (ACL) that specify permission settings necessary for viewing and/or editing the data in a dataset. In an embodiment, orchestrator figuration file 160 may further include parameters or settings for specifying a build schedule for a dataset by a transformation service 170. However, in another embodiment, parameters, settings, or commands for specifying a build schedule or initiating a build may be received by orchestrator 150 via an API from an external application. In an embodiment, orchestrator configuration file 160 may further include parameters or settings that identify one or more data transformation jobs to perform on a dataset. The process 200 may then proceed to step 260.

In step 260, orchestrator 150 may use the settings of orchestrator configuration file 160 to cause the exported dataset to be generated. In an embodiment, orchestrator 150 may combine the configuration settings from orchestrator configuration file 160 with the formatted dataset to generate the exported dataset. In another embodiment, orchestrator 150 may send a command to an external application to retrieve the formatted dataset from the datastore and combine it with the configuration settings from orchestrator configuration file 160 to cause the external application to generate the exported dataset. In an embodiment, the exported dataset may be stored in a datastore. In another embodiment, the orchestrator 150 may send the configuration settings from orchestrator configuration file 160 directly to transform service 170 without packaging them with the dataset. The process 200 may then proceed to step 270.

In step 270, the orchestrator 150 causes the transformation service 170 to retrieve the exported dataset. For example, in one embodiment, transformation service 170 may retrieve the exported dataset from a datastore. In another embodiment, transformation service 170 may receive the exported dataset from orchestrator 150. The process 200 may then proceed to step 280.

In step 280, the transformation service 170 is programmed or configured to use the configuration settings retrieved from orchestrator configuration file 160 in performing one or more data transformation jobs on the exported dataset. In an embodiment, transformation service 170 may use the identification of data transformation jobs in orchestrator configuration file 160 to determine which data transformation jobs to apply to the exported dataset. In an embodiment, transformation service 170 may use the schedule specified in orchestration configuration file 160 to schedule the data transformation jobs on the exported dataset. For example, in one embodiment, a schedule setting may indicate to transformation service 170 that it should perform a nightly build of a data transformation job on exported dataset. In an embodiment, transformation service 170 may use the ACL settings to limit and control access permissions for users and/or groups of users that are attempting to view and/or edit datasets generated based on exported dataset. The process 200 may then end.

4.0 Implementation Mechanisms—Hardware Overview

Figure 3:
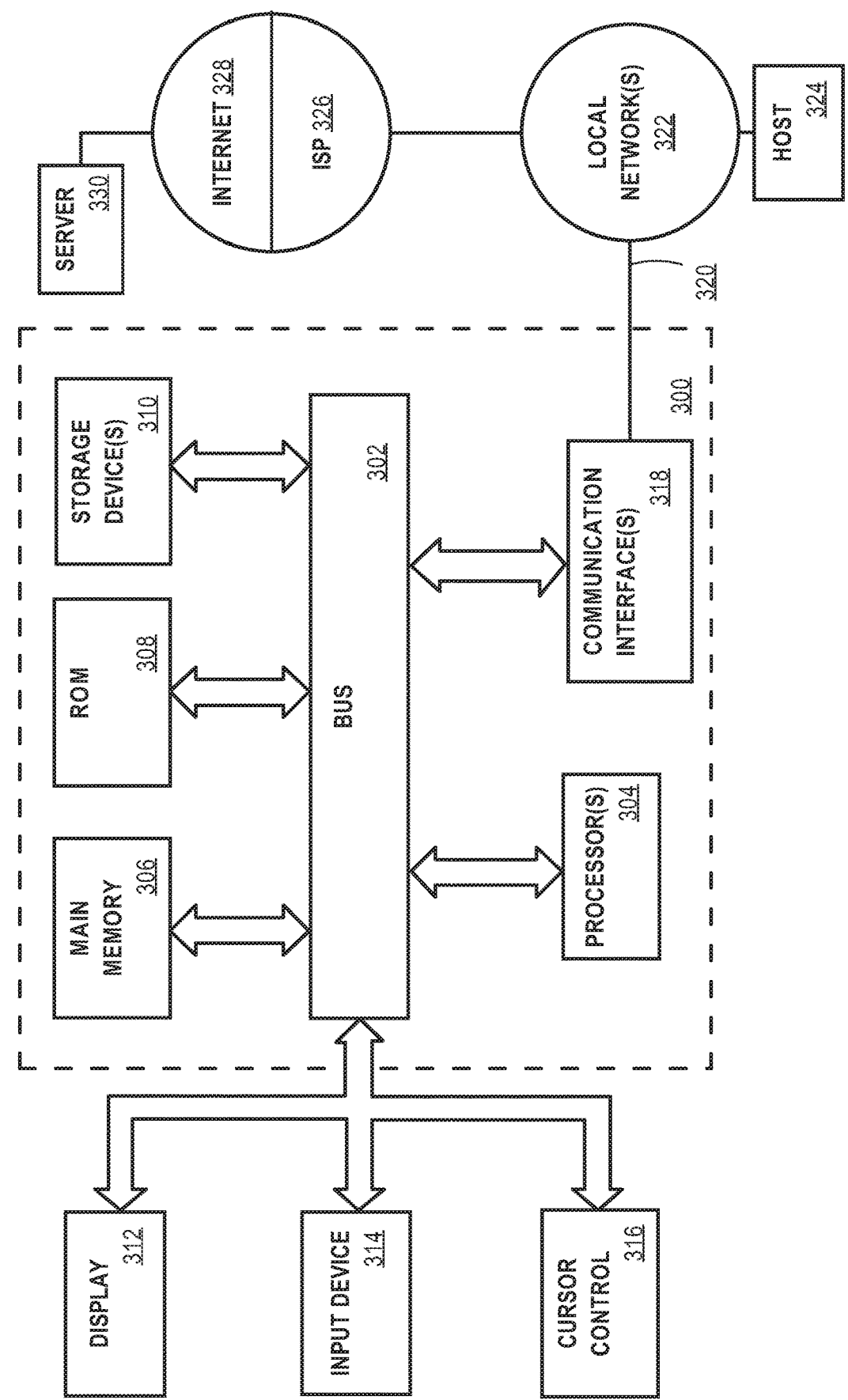
FIG. 3 is a block diagram of a computing device in which the example embodiment(s) of the present invention may be embodied.

Referring now to FIG. 3, it is a block diagram that illustrates a computing device 300 in which the example embodiment(s) of the present invention may be embodied. Computing device 300 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 300 may include a bus 302 or other communication mechanism for addressing main memory 306 and for transferring data between and among the various components of device 300.

Computing device 300 may also include one or more hardware processors 304 coupled with bus 302 for processing information. A hardware processor 304 may be a general-purpose microprocessor, a system on a chip (SoC), or other processor.

Main memory 306, such as a random access memory (RAM) or other dynamic storage device, also may be coupled to bus 302 for storing information and software instructions to be executed by processor(s) 304. Main memory 306 also may be used for storing temporary variables or other intermediate information during execution of software instructions to be executed by processor(s) 304.

Software instructions, when stored in storage media accessible to processor(s) 304, render computing device 300 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 300 also may include read only memory (ROM) 308 or other static storage device coupled to bus 302 for storing static information and software instructions for processor(s) 304.

One or more mass storage devices 310 may be coupled to bus 302 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 310 (e.g., the main hard disk for the device) stores a body of program and data for directing operation of the computing device, including an operating system, user application programs, driver and other support files, as well as other data files of all sorts.

Computing device 300 may be coupled via bus 302 to display 312, such as a liquid crystal display (LCD) or other electronic visual display, for displaying information to a computer user. In some configurations, a touch sensitive surface incorporating touch detection technology (e.g., resistive, capacitive, etc.) may be overlaid on display 312 to form a touch sensitive display for communicating touch gesture (e,g., finger or stylus) input to processor(s) 304.

An input device 314, including alphanumeric and other keys, may be coupled to bus 302 for communicating information and command selections to processor 304. In addition to or instead of alphanumeric and other keys, input device 314 may include one or more physical buttons or switches such as, for example, a power on/oft) button, a "home" button, volume control buttons, or the like.

Another type of user input device may be a cursor control 316, such as a mouse, a trackball, or cursor direction keys for communicating direction information and command selections to processor 304 and for controlling cursor movement on display 312. This input device typically has two degrees of freedom in two axes, a first axis and a second axis (e.g., y), that allows the device to specify positions in a plane.

While in some configurations, such as the configuration depicted in FIG. 3, one or more of display 312, input device 314, and cursor control 316 are external components (i.e., peripheral devices) of computing device 300, some or all of display 312, input device 314, and cursor control 316 are integrated as part of the form factor of computing device 300 in other configurations.

Functions of the disclosed systems, methods, and modules may be performed by computing device 300 in response to processor(s) 304 executing one or more programs of software instructions contained in main memory 306. Such software instructions may be read into main memory 306 from another storage medium, such as storage device(s) 310. Execution of the software instructions contained in main memory 306 cause processor(s) 304 to perform the functions of the example embodiment(s).

While functions and operations of the example embodiment(s) may be implemented entirely with software instructions, hard-wired or programmable circuitry of computing device 300 (e.g., an ASIC, a PGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more software instructions to processor(s) 304 for execution. For example, the software instructions may initially be carried on a magnetic disk or solid-state drive of a remote computer. The remote computer can load the software instructions into its dynamic memory and send the software instructions over a telephone line using a modem. A modem local to computing device 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor(s) 304 retrieves and executes the software instructions. The software instructions received by main memory 306 may optionally be stored on storage device(s) 310 either before or after execution by processor(s) 304.

Computing device 300 also may include one or more communication interface(s) 318 coupled to bus 302. A communication interface 318 provides a two-way data communication coupling to a wired or wireless network link 320 that is connected to a local network 322 (e.g., Ethernet network, Wireless Local Area Network, cellular phone network, Bluetooth wireless network, or the like). Communication interface 318 sends and receives electrical, electromagnetic, or optical signals that carry digital data streams representing various types of information. For example, communication interface 318 may be a wired network interface card, a wireless network interface card with an integrated radio antenna, or a modem (e.g., ISDN, DSL, or cable modem).

Network link(s) 320 typically provide data communication through one or more networks to other data devices. For example, a network link 320 may provide a connection through a local network 322 to a host computer 324 or to data equipment operated by an Internet Service Provider (ISP) 326. ISP 326 in turn provides data communication services through the world wide packet data communication network now commonly referred to as the "Internet" 328. Local network(s) 322 and Internet 328 use electrical, electromagnetic or optical signals that carry digital data streams. The signals through the various networks and the signals on network link(s) 320 and through communication interface(s) 318, which carry the digital data to and from computing device 300, are example forms of transmission media.

Computing device 300 can send messages and receive data, including program code, through the network(s), network link(s) 320 and communication interface(s) 318. In the Internet example, a server 330 might transmit a requested code for an application program through Internet 328, ISP 326, local network(s) 322 and communication interface(s) 318.

The received code may be executed by processor 304 as it is received, and/or stored in storage device 310, or other non-volatile storage for later execution.

5.0 Implementation Mechanisms—Software Overview

Figure 4:
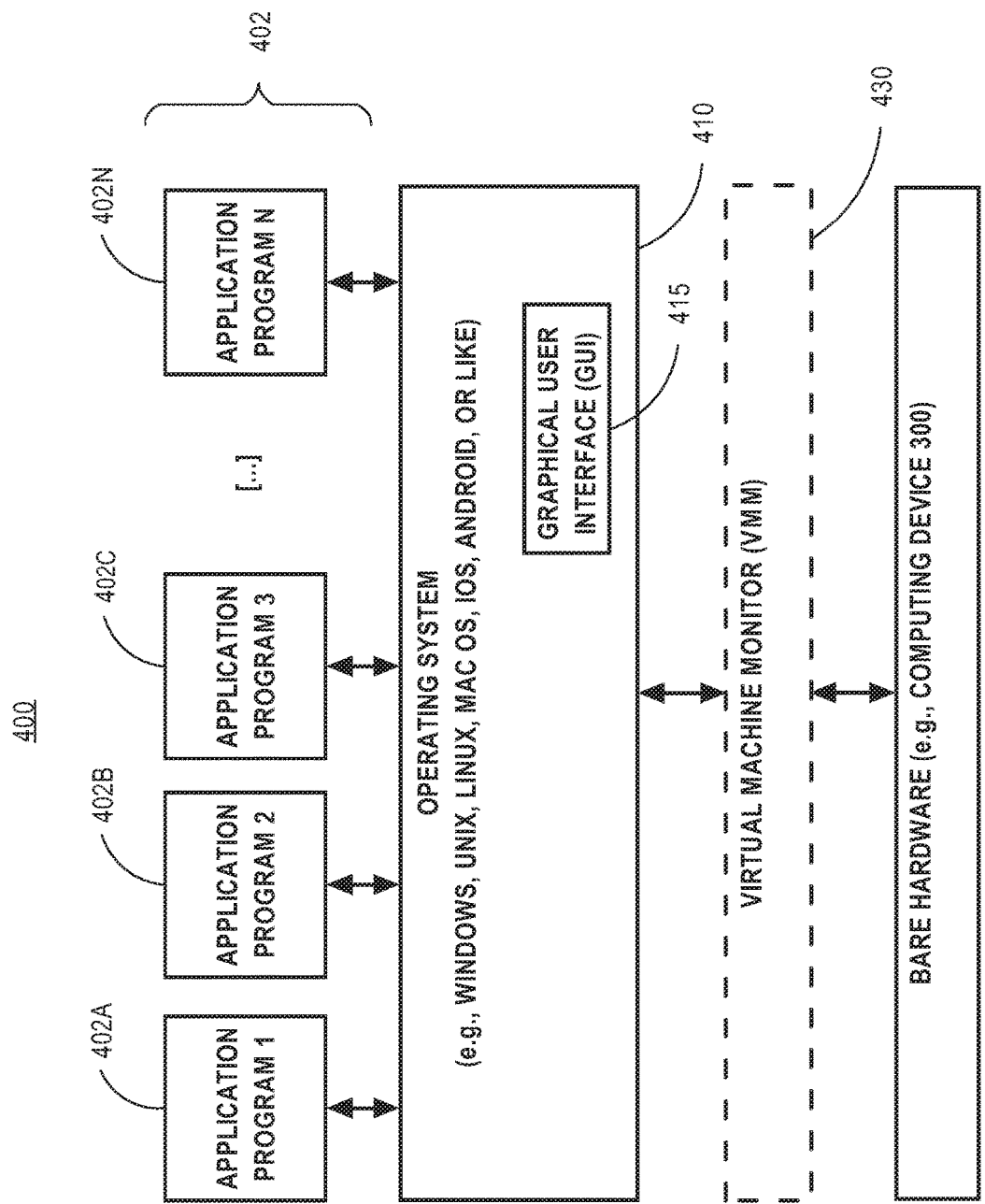
FIG. 4 is a block diagram of a software system for controlling the operation of the computing device.

FIG. 4 is a block diagram of a software system 400 that may be employed for controlling the operation of computing device 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing device 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on device 400 may also be stored as a set of downloadable computer-executable instructions, for example, for downloading and installation from an Internet location a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of device 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the device 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of device 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method comprising:
retrieving a first configuration file, the first configuration file comprising:
a plurality of different data transformation tasks, each of the tasks denoted using a task identifier that identifies a particular task to apply to a set of input data and associated with task-specific criteria for execution of the particular task;
a schema definition for a dataset, wherein the schema definition defines a plurality of columns and a data type for each column of the plurality of columns;
retrieving a second configuration file, the second configuration file comprising an access control list that defines one or more access control permissions for the dataset;
receiving an input file that includes an input dataset;
in response to receiving the input file, based on reading the first configuration file and reading the second configuration file:
applying the plurality of different data transformation tasks to the input dataset based upon the first configuration file to generate an output file including an output dataset that is formatted differently from the input dataset, wherein the output dataset is formatted according to the task-specific criteria and aligns with the plurality of columns as defined by the schema definition of the first configuration file;
determining output access control permissions for the output dataset based on the access control list of the second configuration file;
wherein the method is performed using one or more processors.

2. The method of claim 1, wherein the output file is a file in a comma separated value (CSV) format.

3. The method of claim 1, wherein the input file is a text file, and further comprising using the first configuration file to apply the particular task to the input dataset, the using comprises:
applying a search-and-replace regular expression, specified in the first configuration file, to each line of the input dataset.

4. The method of claim 1, wherein the input file is a COBOL binary file, and further comprising using the first configuration file to apply the particular task to the input dataset, the using comprises:
using an expected byte size specified in the first configuration file to identify a location of a field in the input dataset; and
retrieving the field from the input dataset.

5. The method of claim 1, wherein the input file is an extensible markup language (XML) file, and further comprising using the first configuration file to apply the particular task to the input dataset, the using comprises:
mapping tagged fields of the XML file to the output dataset.

6. The method of claim 1, wherein the input dataset comprises a single text column with fixed-width fields, and further comprising using the first configuration file to apply the particular task to the input dataset, the using comprises:
using an array of fixed-width values specified in the first configuration file to map the fixed-width fields of the input dataset to the output dataset.

7. The method of claim 1, wherein the input file is a zip archive comprising text files, and further comprising using the first configuration file to apply the particular task to the input dataset, the using comprises:
mapping content of the text files to the output dataset.

8. The method of claim 7, wherein the zip archive is encrypted, and wherein the using further comprises:
decrypting the zip archive.

9. The method of claim 1, wherein the input file is a text file, and further comprising using the first configuration file to apply the particular task to the input dataset, the using comprises:
removing all blank lines from the input dataset.

10. The method of claim 1, wherein the input dataset is formatted as rows of text, and further comprising using the first configuration file to apply the particular task to the input dataset, the using comprises:
using a first setting specified in the first configuration file to identify a number of header rows to remove from the input dataset; and
using a second setting specified in the first configuration file to identify a number of footer rows to remove from the input dataset.

11. The method of claim 1, the input dataset being a single-column dataset, and further comprising using the first configuration file to transform the single-column dataset into a multi-column dataset that is delimited according to the schema definition.

12. One or more non-transitory computer-readable media storing instructions, which when executed by one or more processors cause:
retrieving a first configuration file, the first configuration file comprising:
a plurality of different data transformation tasks, each of the tasks denoted using a task identifier that identifies a particular task to apply to a set of input data and associated with task-specific criteria for execution of the particular task;
a schema definition for a dataset, wherein the schema definition defines a plurality of columns and a data type for each column of the plurality of columns;
retrieving a second configuration file, the second configuration file comprising an access control list that defines one or more access control permissions for the dataset;
receiving an input file that includes an input dataset;
in response to receiving the input dataset, file, based on reading the first configuration file and reading the second configuration file:
applying the plurality of different data transformation tasks to the input dataset based upon the first configuration file to generate an output file including an output dataset that is formatted differently from the input dataset, wherein the output dataset is formatted according to the task-specific criteria and aligns with the plurality of columns as defined by the schema definition of the first configuration file;
determining output access control permissions for the output dataset based on the access control list of the second configuration file.

13. The one or more non-transitory computer-readable media of claim 12, wherein the output file is a file in a comma separated value (CSV) format.

14. The one or more non-transitory computer-readable media of claim 12, wherein the input file is a text file, and wherein the instructions, which when executed by the one or more processors, further cause:
applying a search-and-replace regular expression, specified in the first configuration file, to each line of the input dataset.

15. The one or more non-transitory computer-readable media of claim 12, wherein the input file is a COBOL binary file, and wherein the instructions, which when executed by the one or more processors, further cause:
using an expected byte size specified in the first configuration file to identify a location of a field in the input dataset; and
retrieving the field from the input dataset.

16. The one or more non-transitory computer-readable media of claim 12, wherein the input file is an extensible markup language (XML) file, and wherein the instructions, which when executed by the one or more processors, further cause:
mapping tagged fields of the XML file to the output dataset.

17. The one or more non-transitory computer-readable media of claim 12, wherein the input dataset comprises a single text column with fixed-width fields, and wherein the instructions, which when executed by the one or more processors, further cause:
using an array of fixed-width values specified in the first configuration file to map the fixed-width fields of the input dataset to the output dataset.

18. The one or more non-transitory computer-readable media of claim 12, wherein the input file is a zip archive comprising text files and wherein the instructions, which when executed by the one or more processors, further cause:
mapping content of the text files to the output dataset.

19. The one or more non-transitory computer-readable media of claim 18, wherein the zip archive is encrypted, and wherein the instructions, which when executed by the one or more processors, further cause:
decrypting the zip archive.

20. The one or more non-transitory computer-readable media of claim 12, wherein the input file is a text, and wherein the instructions, which when executed by the one or more processors, further cause:
removing all blank lines from the input dataset.

21. The one or more non-transitory computer-readable media of claim 12, wherein the input dataset is formatted as rows of text, and wherein the instructions, which when executed by the one or more processors, further cause:
using a first setting specified in the first configuration file to identify a number of header rows to remove from the input dataset; and
using a second setting specified in the first configuration file to identify a number of footer rows to remove from the input dataset.

* * * * *